United States Patent [19]

Tsuji et al.

[11] Patent Number: 4,827,289

[45] Date of Patent: May 2, 1989

[54] THERMAL HEAD

[75] Inventors: Shiro Tsuji; Eizo Naya; Takashi Yamanaka; Yoshihiro Usui; Hiroshi Ito; Noriyuki Hasebe, all of Amagasaki, Japan

[73] Assignee: Mitsubishi Denki Kabushiki Kaisha, Tokyo, Japan

[21] Appl. No.: 212,060

[22] Filed: Jun. 23, 1988

Related U.S. Application Data

[63] Continuation of Ser. No. 894,018, Aug. 7, 1986, abandoned.

[30] Foreign Application Priority Data

| | | | |
|---|---|---|---|
| Aug. 12, 1985 | [JP] | Japan | 60-178241 |
| Sep. 6, 1985 | [JP] | Japan | 60-197990 |

[51] Int. Cl.[4] .................... G01D 15/10; H01C 1/012; E05D 1/36; B32B 15/04

[52] U.S. Cl. .................... 346/76 PH; 219/216; 338/309; 427/402; 427/103; 427/419.7; 428/627; 428/629

[58] Field of Search .................... 346/76 PH; 219/216; 338/308, 309; 400/120; 427/58, 96, 103, 402, 404, 419.2, 41, 419.7; 428/209, 210, 426, 627, 629

[56] References Cited

U.S. PATENT DOCUMENTS

| | | | |
|---|---|---|---|
| 4,168,343 | 9/1979 | Arai et al. | 428/426 |
| 4,296,309 | 10/1981 | Shinmi et al. | 219/216 |

FOREIGN PATENT DOCUMENTS

| | | | |
|---|---|---|---|
| 55-82678 | 6/1980 | Japan | 400/120 |
| 55-82677 | 6/1980 | Japan | 400/120 |
| 56-30875 | 3/1981 | Japan | 400/120 |
| 56-89578 | 7/1981 | Japan | 400/120 |
| 56-133183 | 10/1981 | Japan | 400/120 |
| 56-150575 | 11/1981 | Japan | 400/120 |
| 56-159178 | 12/1981 | Japan | 400/120 |
| 57-25976 | 2/1982 | Japan | 400/120 |
| 58-132572 | 8/1983 | Japan | 400/120 |
| 59-8234 | 2/1984 | Japan | 400/120 |
| 60-9770 | 1/1985 | Japan | 400/120 |
| 1524347 | 9/1978 | United Kingdom | 400/120 |
| 2142583A | 1/1985 | United Kingdom | 400/120 |

OTHER PUBLICATIONS

IBM Technical Disclosure Bulletin, vol. 22, No. 2, Jul. 1979, Kolb et al., "IR Alignment of Two or More Opaque Silicon Wafers", pp. 841–842.

*Primary Examiner*—E. A. Goldberg
*Assistant Examiner*—Gerald E. Preston
*Attorney, Agent, or Firm*—Lowe, Price, LeBlanc, Becker & Shur

[57] ABSTRACT

A thermal head for a printer in accordance with the present invention comprises: a substrate (11); a heater layer (12) on the substrate; lead wires (13*a* and 13*b*) formed on the heater layer for supplying electric power to the heater layer; and a single protective layer (20) for protecting the heater layer and the lead wires by covering them, the protective layer including an oxide or a nitride.

2 Claims, 3 Drawing Sheets

THERMAL HEAD

This application is a continuation of application Ser. No. 894,018 filed Aug. 7, 1986, now abandoned.

BACKGROUND OF THE INVENTION

1. Field of the Invention

The present invention relates to a thermal head for a printer, and particularly to a thermal head suitable for high speed printing, which has a long-lived heater and a long-lived protective layer.

2. Description of the Prior Art

In the prior art, there are printers of an impact type, a thermal printing type, an ink jet type and the like. Among them, the impact type is most popularly utilized. However, a printer of the impact type has limitations in the number of dots printed per unit area and in the size of a single dot and is not suited for printing of fine characters. In addition, a printer of the impact type performs its printing operation mechanically and has the drawback that makes noise during operation.

For a printer of the thermal printing type, heater elements can be made very small since a thermal head can be manufactured by photolithography and therefore fine printing operation is possible. Such a printer of the thermal printing type performs printing operation thermally and does not produce any noise. In view of these merits, a demand for printers of the thermal printing type is rapidly increasing and it is desirable to make further improvements in the lifetime of a thermal head and the printing speed.

The performance of a thermal head depends definitely on the material of the heater and the material of a protective film applied thereon. In order to obtain a thermal head having excellent performance, it is necessary to develop appropriate materials for a heater and a protective film.

FIG. 1 is an enlarged fragmentary sectional view illustrating a conventional thermal head. A heater layer 12 is formed on a substrate 11 and lead wires 13*a* and 13*b* are formed on the heater layer 12. The heater layer 12 and the lead wires 13*a* and 13*b* are covered with an antioxidant layer 14 and an abrasion resisting layer 15.

In operation, the heater layer 12 generates heat between the lead wires 13*a* and 13*b* to which electric power is supplied. A thermosensible paper or an ink ribbon (not shown) is interposed between the thermal head and a platen (not shown) so that characters are printed on the thermosensible paper or transfer paper.

A conventional thermal head, e.g., as disclosed in Japanese Patent Publication No. 8234/1984, comprises a heater layer 12 of TaN, Ta-$SiO_2$ or the like, an antioxidant layer 14 of $SiO_2$ and an abrasion resisting layer 15 of $Ta_2O_5$. Since the protective film of this thermal head is formed by two layers, namely, the antioxidant layer 14 and the abrasion resisting layer 15, the process of manufacturing the protective film is complicated and takes much time. In addition, although the combination of the $SiO_2$ antioxidant layer 14 and the $Ta_2O_5$ abrasion resisting layer 15 assures a thermal head having relatively long lifetime, further development is desired to obtain a thermal head having a longer lifetime and assuring higher printing speed with a considerable saving of energy.

SUMMARY OF THE INVENTION

A primary object of the present invention is to provide a thermal head having a long lifetime, the manufacturing process of which is simplified.

A thermal head according to an aspect of the present invention comprises a protective layer containing at least one of the oxides of Ti, Zr, Hf, V, Nb, Cr, Mo, W, B, Mn, Fe, Ni, Co, Th and Ge.

A thermal head according to another aspect of the present invention comprises a protective layer containing at least one of the nitrides of Ti, Zr, Hf, V, Nb, Al, B and Th.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
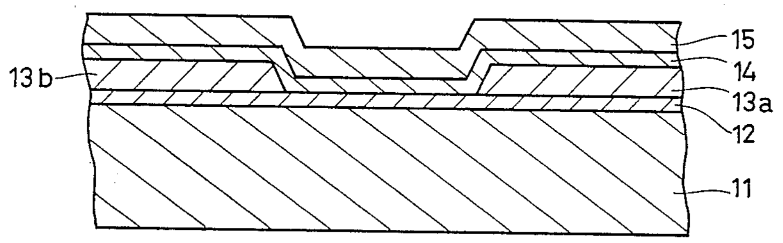
FIG.1 PRIOR ART
FIG. 1 is an enlarged fragmentary sectional view illustrating a conventional thermal head.
Figure 2:
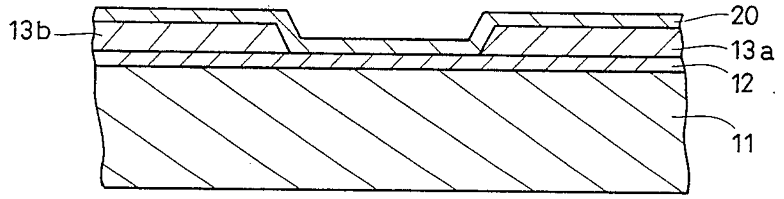
FIG. 2 is an enlarged fragmentary sectional view illustrating a thermal head in accordance with the present invention.

FIG. 2 is an enlarged fragmentary sectional view illustrating a thermal head of an embodiment of the present invention. This thermal head is similar to that of FIG. 1 except that a heater layer 12 and lead wires 13*a* and 13*b* are covered with a single layer 20 of a selected oxide or nitride instead of two distinct layers, i.e., the antioxidant layer 14 and the abrasion resisting layer 15.

In the following, thermal heads according to the embodiments of the present invention will be described in comparison with a conventional thermal head.

Sample 1a as a conventional head

This sample 1a was obtained in the following manner. A Ta-$SiO_2$ heater layer of 3000 to 4000 Å in thickness was formed on a sufficiently clean grazed alumina substrate having a glass coating of 40 to 50 $\mu m$ in thickness by a double-pole radio frequency sputtering process in an Ar atmosphere at $4 \times 10^{-3}$Pa. The sputtering was performed with input power of 2 KW for 80 minutes. The sheet resistivity of the heater layer 12 thus obtained was 170 Ω/□. An Al layer of 1 to 2 $\mu m$ in thickness for lead wires 13*a*, 13*b*, etc. was formed on the heater layer 12 by sputtering and a thermal head pattern of 7/mm was formed by selective etching. Then, an antioxidant layer 14 of $SiO_2$ having a thickness of 2 $\mu m$ and an abrasion resisting layer of $Ta_2O_5$ having a thickness of 5 $\mu m$ were formed by sputtering.

Sample 1b for comparison

This sample 1b was formed in the same manner as for the sample 1a, except that an antioxidant layer 14 of $SiO_2$ as stated above was not provided.

Sample 2a as a first embodiment of the invention

A Ta-$SiO_2$ heater layer 12 of 3000 to 4000 Å in thickness was formed on a sufficiently clean grazed alumina substrate having a glass coating of 40 to 50 μm in thickness by double-pole radio frequency sputtering in an Ar atmosphere at $4\times10^{-3}$Pa. The sputtering was performed with input power of 2 KW for 80 minutes. The sheet resistivity of the heater layer 12 thus obtained was 170 Ω/□. An Al layer of 1 to 2 μm in thickness was formed on the heater layer 12 by sputtering and a thermal head pattern of 7/mm was formed by selective etching. Then, a protective layer 20 of $Nb_2O_5$ having a thickness of 5 μm was formed by sputtering with input power of 2 KW for 10 hr in an Ar atmosphere at $4\times10^{-3}$Pa.

Sample 2b as a second embodiment

This sample 2b was formed in the same manner as for the sample 2a, except that a protective layer 20 was formed of BN instead of $Nb_2O_5$.

Sample 3a as a third embodiment

A Mn-$SiO_2$ heater layer 12 of 3000 to 4000 Å in thickness was formed on a sufficiently clean grazed alumina substrate having a glass coating of 40 to 50 μm in thickness by double-pole radio frequency sputtering in an Ar atmosphere at $4\times10^{-3}$Pa. The sputtering was performed with input power of 2 KW for 60 minutes. The sheet resistivity of the heater layer 12 thus obtained was 220 Ω/□. An Al lead wires **13*a*, 13*b*, etc. of 1 to 2 μm in thickness were formed on the heater layer 12 by sputtering and etching and thereafter a $Nb_2O_5$ protective layer 20** of 5 μm in thickness was formed by sputtering in an Ar atmosphere at $4\times10^{-3}$Pa.

Sample 3b as a fourth embodiment

This sample 3b was formed in the same manner as for the sample 3a, except that a protective layer 20 of this sample was formed of BN instead of $Nb_2O_5$.

Stepped stress test

Figure 3:
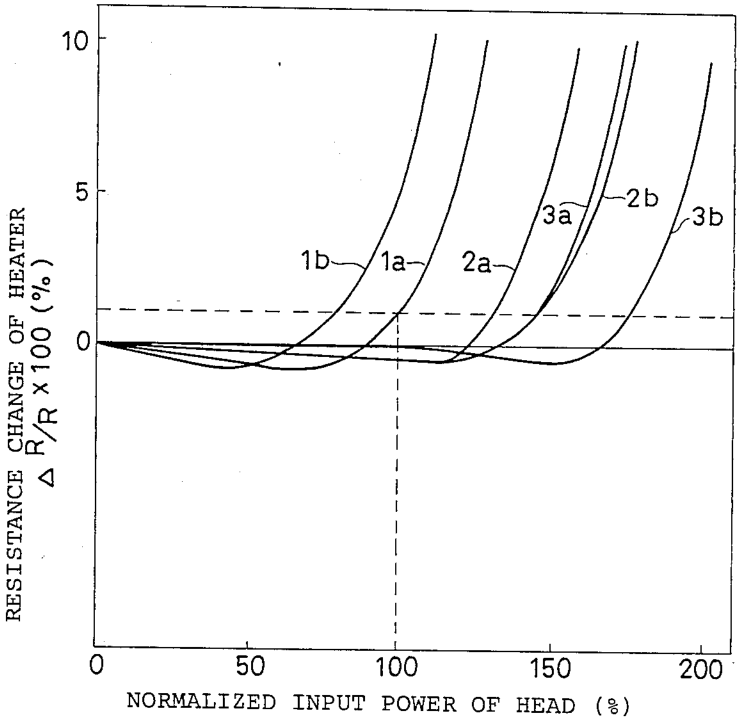
FIG. 3 is a diagram showing the resistance change in heaters during a stepped stress test of thermal heads.

FIG. 3 is a graph showing the resistance change in the heater during a stepped stress test for the above stated various samples. In the stepped stress test, an acclerated test was conducted by repeating a cycle consisting of: applying pulse voltage of 100 Hz for 3 minutes, stopping the supply of power for 1 minute and then applying again for 3 minutes electric power increased by 0.05 W. Input powers producing a resistance change of 1% in the respective heaters of the above stated samples were compared as permissible input powers. In FIG. 3, the vertical axis represents the resistance change and the horizontal axis represents the input power normalized by the input power which causes the sample 1a of the conventional head to exhibit the resistance change of 1%.

As can be seen from FIG. 3, the sample 2a of the first embodiment is capable of receiving input power higher than that of the conventional head sample 1a by 30% and is capable of receiving input power twice as high as that of the sample 1b for comparison not containing an $SiO_2$ antioxidant layer 14. Similarly, it can also be seen that the samples 2b, 3a and 3b of the other embodiment are capable of receiving much higher input powers compared with the above stated samples 1a and 1b.

Figure 4:
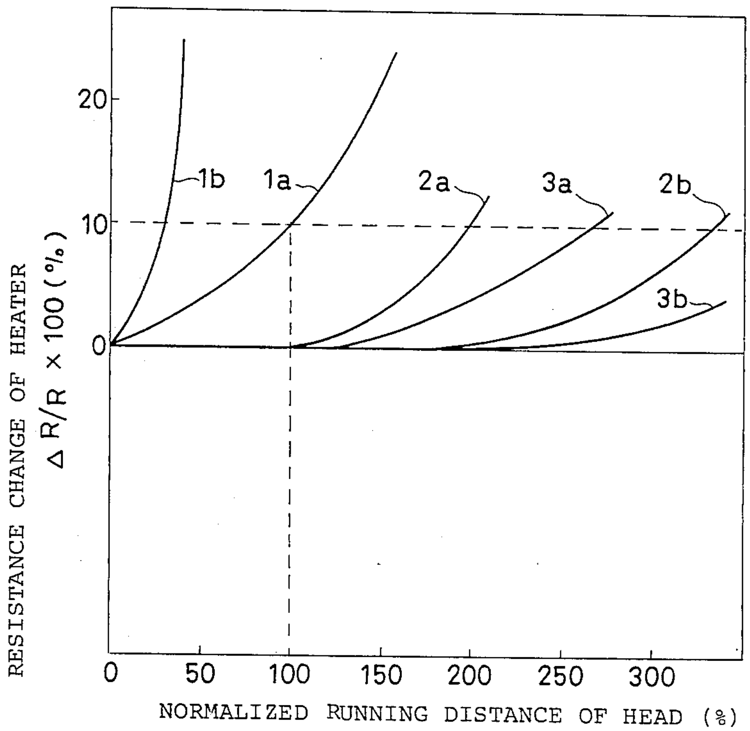
FIG. 4 is a diagram showing the resistance change in heaters during a running test for printing operation.

FIG. 4 is a graph showing the resistance change in the heater during the running test of the above stated sample heads. In the running test, each sample head was incorporated in a printer and continuous printing was made with input power of 0.55 W per dot and 30 characters/sec. As to the running distances of the respective sample heads, comparison was made of the running distances by which the respective heaters exhibited a resistance change of 10%. In FIG. 4, the vertical axis indicates the resistance change of the heater and the horizontal axis indicates the normalized running distance, the running distance being normalized by the value of the running distance by which the conventional head **1*a*** exhibits a resistance change of 10%.

As can be seen from FIG. 4, the sample 2a of the first embodiment has the running distance approximately twice as long as that of the conventional head 1a. It can also be seen that the samples 2b, 3a and 3b of the other embodiments have much longer running distances than that of the conventional head 1a. One of the reasons for the longer running distances of the thermal heads in accordance with the present invention is considered to be that the input power in the running test was sufficiently smaller than the permissible input power with respect to the heads of the present invention but substantially attained or exceeded the permissible input power with respect to the sample 1b for comparison or the conventional head **1*a*. A second reason is considered to be that there was little abrasion of the respective protective layers 20** in the samples of the present invention.

Further embodiments

Besides the above stated samples, sample heads were prepared using various materials and the characteristics thereof were examined.

Sputtering targets of various materials for forming a heater layer 12 were prepared using a vacuum hot press apparatus. An example of the preparing process of those targets will be described in the following.

Mn powder, and $SiO_2$ powder each being not larger than 350 mesh size, were mixed at a predetermined ratio in a wet manner with ethyl alcohol for 2 hr in an automated mortar. Then, the mixed powder was dried and after that it was placed in a vacuum hot press apparatus at 1500° C. under a pressure of 400 kg/cm². Thus, a dense Mn-$SiO_2$ sputtering target was obtained. The above-described Ta-$SiO_2$ sputtering target was also prepared in the same manner using Ta powder of 325 mesh size instead of Mn powder. The targets of the other materials were also manufactured in the same manner using a vacuum hot press apparatus.

Table I shows characteristics of the thermal heads having various combinations of heater materials and protective film materials thus obtained. The left end column indicates various heater materials and the top row indicates various oxides as the protective film materials. For example, the characteristics of the thermal head **2*a* of the first embodiment having the heater layer 12 of Ta-$SiO_2$ and the protective layer 20 of $Nb_2O_5$ are indicated in the box defined by an intersection between the row of Ta-$siO_2$ and the column of $Nb_2O_5$. The value on the upper line in each box indicates a resistance value (Ω/□) of a heater layer 12**; the value on the middle line indicates normalized permissible input power in the stepped stress test; and the value on the lower line indicates normalized running distance in the running test. The initial resistance value of each heater layer is indicated representatively on the upper line of each box in only the column of $Nb_2O_5$. Blanks in the boxes mean that the experiments concerned were not made.

As is understood from the column of $Nb_2O_5$ for example, there is a correlation between the result of the stepped stress test and the result of the printing running test. Consequently, although the running test could not be conducted for all the samples because the running distance attains nearly 100 km in the running test, it is believed that a thermal head having a higher permissible input power in the stepped stress test has a longer running distance.

TABLE I

| Heater layer | Protective Film | | | | | | | | | | | | | | | |
|---|---|---|---|---|---|---|---|---|---|---|---|---|---|---|---|---|
| | $Nb_2O_5$ | $ThO_2$ | $B_2O_3$ | CoO | $Cr_2O_3$ | $Fe_3O_4$ | $GeO_2$ | $HfO_2$ | $MoO_3$ | $MnO_2$ | NiO | $TiO_2$ | $V_2O_5$ | $WO_2$ | $Y_2O_3$ | $ZrO_2$ |
| Ta—$SiO_2$ | 170 | ← | ← | ← | ← | ← | ← | ← | ← | ← | ← | ← | ← | ← | ← | ← |
| | 130 | 145 | 90 | 130 | 110 | 120 | 125 | 135 | 100 | 125 | 130 | 120 | 90 | 120 | 145 | 120 |
| | 200 | 270 | — | 190 | — | — | — | 220 | — | — | 195 | — | — | — | 230 | — |
| Mn—$SiO_2$ | 320 | ← | ← | ← | ← | ← | ← | ← | ← | ← | ← | ← | ← | ← | ← | ← |
| | 145 | 150 | 100 | 135 | 120 | 115 | 135 | 145 | 120 | 130 | 140 | 135 | 110 | 130 | 155 | 130 |
| | 265 | 275 | — | 220 | — | — | 200 | 250 | — | 210 | 240 | 215 | — | 190 | 270 | 190 |
| Mo—$SiO_2$ | 160 | ← | ← | ← | ← | ← | ← | ← | ← | ← | ← | ← | ← | ← | ← | ← |
| | 125 | 125 | — | 115 | 105 | 125 | 125 | 130 | 90 | 115 | 125 | 120 | — | — | 135 | 115 |
| | 170 | 160 | — | — | — | — | — | 180 | — | — | — | — | — | — | 190 | — |
| Ti—$SiO_2$ | 270 | ← | ← | ← | ← | ← | ← | ← | ← | ← | ← | ← | ← | ← | ← | ← |
| | 140 | 145 | — | 135 | 125 | 135 | 130 | 130 | — | 125 | 135 | 135 | — | — | 140 | 125 |
| | 225 | 230 | — | 200 | — | 190 | 200 | 205 | — | — | 210 | 200 | — | — | 230 | — |
| Zr—$SiO_2$ | 255 | ← | ← | ← | ← | ← | ← | ← | ← | ← | ← | ← | ← | ← | ← | ← |
| | 135 | 150 | — | 125 | 115 | 130 | 135 | 125 | — | 130 | 135 | 130 | — | — | 130 | 110 |
| | 230 | 220 | — | — | — | 195 | 200 | — | — | 190 | 210 | 195 | — | — | 225 | — |
| Hf—$SiO_2$ | 240 | ← | ← | ← | ← | ← | ← | ← | ← | ← | ← | ← | ← | ← | ← | ← |
| | 135 | 130 | — | 120 | 100 | 125 | 125 | 135 | — | 130 | 135 | 130 | — | — | 135 | 130 |
| | 170 | 200 | — | — | — | — | — | 190 | — | 185 | 195 | 170 | — | — | 195 | 165 |
| V—$SiO_2$ | 225 | ← | ← | ← | ← | ← | ← | ← | ← | ← | ← | ← | ← | ← | ← | ← |
| | 130 | 140 | — | 135 | 115 | 120 | 125 | 125 | — | 125 | 130 | 125 | — | — | 135 | 105 |
| | 150 | 195 | — | 165 | — | — | — | — | — | — | 160 | — | — | — | 175 | — |
| Nb—$SiO_2$ | 200 | ← | ← | ← | ← | ← | ← | ← | ← | ← | ← | ← | ← | ← | ← | ← |
| | 140 | 160 | — | 130 | 115 | 125 | 135 | 140 | — | 135 | 140 | 135 | — | — | 145 | 130 |
| | 230 | 225 | — | 190 | — | 170 | 210 | 215 | — | 195 | 220 | 185 | — | — | 230 | 170 |
| Cr—$SiO_2$ | 205 | ← | ← | ← | ← | ← | ← | ← | ← | ← | ← | ← | ← | ← | ← | ← |
| | 135 | 135 | — | 120 | 100 | 115 | 125 | 125 | — | 130 | — | — | — | — | 135 | — |
| | 150 | 145 | — | — | — | — | — | — | — | 150 | — | — | — | — | 160 | — |
| W—$SiO_2$ | 180 | ← | ← | ← | ← | ← | ← | ← | ← | ← | ← | ← | ← | ← | ← | ← |
| | 120 | 140 | — | 125 | 100 | 115 | 120 | 125 | — | 120 | — | — | — | — | 125 | — |
| | 170 | 185 | — | — | — | — | — | — | — | — | — | — | — | — | — | — |
| Fe—$SiO_2$ | 175 | ← | ← | ← | ← | ← | ← | ← | ← | ← | ← | ← | ← | ← | ← | ← |
| | 110 | 125 | — | 115 | 90 | 115 | 115 | 105 | — | 110 | — | — | — | — | 125 | — |
| | 130 | — | — | — | — | — | — | — | — | — | — | — | — | — | — | — |
| Ni—$SiO_2$ | 165 | ← | ← | ← | ← | ← | ← | ← | ← | ← | ← | ← | ← | ← | ← | ← |
| | 120 | 130 | — | 120 | 100 | 120 | 125 | 120 | — | 125 | — | — | — | — | 130 | — |
| | 170 | 160 | — | — | — | — | — | — | — | — | — | — | — | — | 165 | — |
| Co—$SiO_2$ | 165 | ← | ← | ← | ← | ← | ← | ← | ← | ← | ← | ← | ← | ← | ← | ← |
| | 130 | 130 | — | 125 | 120 | 125 | 125 | 115 | — | 120 | — | — | — | — | 135 | — |
| | 180 | 185 | — | — | — | — | — | — | — | — | — | — | — | — | 175 | — |
| Ta—Mo—$SiO_2$ | 230 | ← | ← | ← | ← | ← | ← | ← | ← | ← | ← | ← | ← | ← | ← | ← |
| | 135 | 150 | — | 140 | 125 | 125 | 130 | 130 | — | 135 | — | — | — | — | 135 | — |
| | 195 | 200 | — | 195 | — | — | 190 | 180 | — | 185 | — | — | — | — | 200 | — |
| Nb—Mo—$SiO_2$ | 250 | ← | ← | ← | ← | ← | ← | ← | ← | ← | ← | ← | ← | ← | ← | ← |
| | 140 | 150 | — | 135 | 120 | 130 | 135 | 130 | — | 185 | — | — | — | — | 140 | — |
| | 215 | 210 | — | 190 | — | 190 | 200 | 195 | — | 190 | — | — | — | — | 220 | — |
| W—Mo—$SiO_2$ | 215 | ← | ← | ← | ← | ← | ← | ← | ← | ← | ← | ← | ← | ← | ← | ← |
| | 140 | 135 | — | 130 | 120 | 135 | 125 | 130 | — | 125 | — | — | — | — | 145 | — |
| | 230 | 200 | — | 170 | — | 160 | — | 170 | — | — | — | — | — | — | 210 | — |
| Ni—Ti—$SiO_2$ | 300 | ← | ← | ← | ← | ← | ← | ← | ← | ← | ← | ← | ← | ← | ← | ← |
| | 145 | 135 | — | 135 | 115 | 125 | 125 | 135 | — | 125 | — | — | — | — | 140 | — |
| | 175 | 170 | — | 170 | — | — | — | 180 | — | — | — | — | — | — | 175 | — |
| Ta—Cr—$SiO_2$ | 240 | ← | ← | ← | ← | ← | ← | ← | ← | ← | ← | ← | ← | ← | ← | ← |
| | 140 | 135 | — | 135 | 125 | 120 | 130 | 140 | — | 135 | — | — | — | — | 145 | — |
| | 180 | 170 | — | 165 | — | — | 170 | 190 | — | 175 | — | — | — | — | 200 | — |
| W—Cr—$SiO_2$ | 225 | ← | ← | ← | ← | ← | ← | ← | ← | ← | ← | ← | ← | ← | ← | ← |
| | 130 | 120 | — | 115 | 95 | 125 | 120 | 125 | — | 125 | — | — | — | — | 135 | — |
| | 170 | — | — | — | — | — | — | — | — | — | — | — | — | — | 175 | — |
| Nb—Cr—$SiO_2$ | 250 | ← | ← | ← | ← | ← | ← | ← | ← | ← | ← | ← | ← | ← | ← | ← |
| | 135 | 145 | — | 140 | 125 | 130 | 130 | 125 | — | 135 | — | — | — | — | 125 | — |
| | 185 | 200 | — | 185 | — | 180 | 190 | — | — | 195 | — | — | — | — | — | — |
| Ta—W—$SiO_2$ | 240 | ← | ← | ← | ← | ← | ← | ← | ← | ← | ← | ← | ← | ← | ← | ← |
| | 115 | 120 | — | 125 | 100 | 125 | 120 | 115 | — | 115 | — | — | — | — | 125 | — |
| | 140 | — | — | — | — | — | — | — | — | — | — | — | — | — | — | — |
| Nb—W—$SiO_2$ | 265 | ← | ← | ← | ← | ← | ← | ← | ← | ← | ← | ← | ← | ← | ← | ← |
| | 135 | 145 | — | 130 | 105 | 130 | 125 | 120 | — | 125 | — | — | — | — | 140 | — |
| | 165 | 180 | — | 160 | — | 170 | — | — | — | — | — | — | — | — | 170 | — |
| Ta—$Cr_2Ta$—$SiO_2$ | 260 | ← | ← | ← | ← | ← | ← | ← | ← | ← | ← | ← | ← | ← | ← | ← |
| | 145 | 165 | — | 140 | 130 | 135 | 140 | 125 | — | 140 | — | — | — | — | 140 | — |
| | 195 | 215 | — | 190 | 150 | 195 | 170 | — | — | 195 | — | — | — | — | 200 | — |
| W—La—$SiO_2$ | 220 | ← | ← | ← | ← | ← | ← | ← | ← | ← | ← | ← | ← | ← | ← | ← |
| | 110 | 130 | — | 115 | 100 | 120 | 130 | 105 | — | 120 | — | — | — | — | 125 | — |
| | 185 | 185 | — | — | — | — | 190 | — | — | — | — | — | — | — | — | — |

Combinations of a heater and a protective film exhibiting particularly excellent characteristics are as follows: Ta-$SiO_2$ and $Nb_2O_5$; Ta-$SiO_2$ and $ThO_2$; Ta-$SiO_2$ and $HfO_2$; Ta-$SiO_2$ and $Y_2O_5$; Mn-$SiO_2$ and $Nb_2O_5$; Mn-$SiO_2$ and CoO; Mn-$SiO_2$ and $GeO_2$; Mn-$SiO_2$ and $HfO_2$; Mn-$SiO_2$ and $MnO_2$; Mn-$SiO_2$ and NiO; Mn-$SiO_2$ and $TiO_2$; Mn-$SiO_2$ and $Y_2O_5$; Ti-$SiO_2$ and $Nb_2O_5$; Ti-$SiO_2$ and $ThO_2$; Ti-$SiO_2$ and CoO; Ti-$SiO_2$ and $GeO_2$; Ti-$SiO_2$ and $HfO_2$; Ti-$SiO_2$ and NiO; Ti-$SiO_2$ and $TiO_2$; Ti-$SiO_2$ and $Y_2O_5$; Zr-$SiO_2$ and $Nb_2O_5$; Zr-$SiO_2$ and $ThO_2$; Nb-$SiO_2$ and $Nb_2O_5$; Nb-$SiO_2$ and $ThO_2$; Nb-$SiO_2$ and $GeO_2$; Nb-$SiO_2$ and $HfO_2$; Nb-$SiO_2$ and NiO; Nb-$SiO_2$ and $Y_2O_5$; Ta-Mo-$SiO_2$ and $ThO_2$; Ta-Mo-$SiO_2$ and $Y_2O_5$; Nb-Mo-$SiO_2$ and $Nb_2O_5$; Nb-Mo-$SiO_2$ and $ThO_2$; Nb-Mo-$SiO_2$ and $GeO_2$; Nb-Mo-$SiO_2$ and $Y_2O_5$; W-Mo-$SiO_2$ and $Nb_2O_5$; W-Mo-$SiO_2$ and $ThO_2$; W-Mo-$SiO_2$ and $Y_2O_5$; Ta-Cr-$SiO_2$ and $Y_2O_5$; Nb-Cr-$SiO_2$ and $ThO_2$; Ta-$Cr_2$Ta-$SiO_2$ and $ThO_2$; Ta-$Cr_2$Ta-$SiO_2$ and $Y_2O_5$ etc. With those combinations, data obtained show the running distances more than twice that of the conventional head.

In addition, the characteristics of a sample 3c having a thinner $Nb_2O_5$ protective layer 20 were examined. The sample 3c was similar to the sample 3a except that the $Nb_2O_5$ protective layer of the sample 3c had a thickness of 3 $\mu m$. The sample 3c exhibited the normalized input power of 135% in the stepped stress test and the normalized running distance of 170% in the running test. Thus, it is understood that the sample 3c having a thinner protective layer 20 still possesses characteristics superior to those of the conventional head. Furthermore, since the sample 3c had the thinner protective layer, the input power required for printing with it was decreased by approximately 10% as a result of decrease in the thermal capacity of the protective layer.

Table II shows characteristics of thermal heads in the same manner as Table I, except that various nitrides are indicated as the protective film in the top row.

TABLE II

| | Protective Film | | | | | | | |
|---|---|---|---|---|---|---|---|---|
| Heater Layer | BN | NbN | TiN | ThN | HfN | VN | ZrN | AlN |
| Ta—$SiO_2$ | 170 | ← | ← | ← | ← | ← | ← | ← |
| | 145 | 110 | 150 | 145 | 155 | 105 | 150 | 120 |
| | 360 | — | 380 | 370 | 390 | — | 340 | — |
| Mn—$SiO_2$ | 220 | ← | ← | ← | ← | ← | ← | ← |
| | 175 | 115 | 160 | 165 | 180 | 115 | 175 | 135 |
| | 400< | — | 360 | 400< | 400 < | — | 400< | 330 |
| Mo—$SiO_2$ | 160 | ← | ← | ← | ← | ← | ← | ← |
| | 135 | 110 | 135 | 130 | 135 | 100 | 145 | 110 |
| | 305 | — | 310 | 310 | 300 | — | 350 | — |
| Ti—$SiO_2$ | 270 | ← | ← | ← | ← | ← | ← | ← |
| | 160 | 120 | 150 | 140 | 160 | 115 | 155 | 125 |
| | 310 | — | 300 | 270 | 350 | — | 340 | 200 |
| Zr—$SiO_2$ | 255 | ← | ← | ← | ← | ← | ← | ← |
| | 150 | 115 | 140 | 130 | 145 | 115 | 150 | 110 |
| | 295 | — | 270 | 240 | 300 | — | 310 | — |
| Hf—$SiO_2$ | 240 | ← | ← | ← | ← | ← | ← | ← |
| | 140 | 105 | 135 | 135 | 145 | 110 | 140 | 115 |
| | 320 | — | 290 | 310 | 310 | — | 295 | — |
| V—$SiO_2$ | 225 | ← | ← | ← | ← | ← | ← | ← |
| | 140 | 110 | 165 | 160 | 170 | 105 | 175 | 140 |
| | 295 | — | 330 | 310 | 330 | — | 340 | 295 |
| Nb—$SiO_2$ | 200 | ← | ← | ← | ← | ← | ← | ← |
| | 155 | 115 | 150 | 140 | 160 | 115 | 155 | 120 |
| | 380 | — | 380 | 340 | 345 | — | 370 | — |
| Cr—$SiO_2$ | 205 | ← | ← | ← | ← | ← | ← | ← |
| | 140 | 105 | 145 | 150 | 155 | 100 | 140 | 125 |
| | 275 | — | 300 | 310 | 300 | — | 290 | 240 |
| W—$SiO_2$ | 180 | ← | ← | ← | ← | ← | ← | ← |
| | 125 | 100 | 135 | 150 | 150 | 95 | 135 | 105 |
| | 250 | — | 260 | 300 | 290 | — | 250 | — |
| Fe—$SiO_2$ | 175 | ← | ← | ← | ← | ← | ← | ← |
| | 120 | 95 | 125 | 135 | 140 | 90 | 130 | 110 |
| | 220 | — | 230 | 240 | 250 | — | 250 | — |
| Ni—$SiO_2$ | 165 | ← | ← | ← | ← | ← | ← | ← |
| | 115 | 95 | 110 | 130 | 140 | 95 | 135 | 105 |
| | 220 | — | — | 230 | 225 | — | 220 | — |
| Co—$SiO_2$ | 165 | ← | ← | ← | ← | ← | ← | ← |
| | 120 | 100 | 125 | 130 | 135 | 95 | 125 | 100 |
| | 240 | — | 230 | 250 | 260 | — | 240 | — |
| Ta—Mo—$SiO_2$ | 230 | ← | ← | ← | ← | ← | ← | ← |
| | 150 | 120 | 170 | 165 | 120 | 160 | 135 | |
| | 360 | — | 350 | 360 | 370 | — | 370 | 320 |
| Nb—Mo—$SiO_2$ | 250 | ← | ← | ← | ← | ← | ← | ← |
| | 160 | 115 | 175 | 180 | 175 | 125 | 155 | 130 |
| | 385 | — | 400< | 400< | 400< | 320 | 370 | 340 |
| W—Mo—$SiO_2$ | 215 | ← | ← | ← | ← | ← | ← | ← |
| | 150 | 115 | 155 | 160 | 170 | 120 | 145 | 140 |
| | 350 | — | 350 | 365 | 360 | — | 330 | 330 |
| Ni—Ti—$SiO_2$ | 300 | ← | ← | ← | ← | ← | ← | ← |
| | 165 | 125 | 160 | 165 | 175 | 125 | 160 | 135 |
| | 340 | 290 | 330 | 350 | 350 | 300 | 340 | 310 |
| Ta—Cr—$SiO_2$ | 240 | ← | ← | ← | ← | ← | ← | ← |
| | 160 | 120 | 175 | 175 | 170 | 110 | 150 | 125 |
| | 375 | — | 395 | 400 | 390 | — | 350 | 310 |
| W—Cr—$SiO_2$ | 225 | ← | ← | ← | ← | ← | ← | ← |
| | 140 | 110 | 145 | 150 | 160 | 115 | 140 | 115 |
| | 305 | — | 330 | 340 | 345 | — | 320 | — |

TABLE II-continued

| Heater Layer | Protective Film | | | | | | | |
|---|---|---|---|---|---|---|---|---|
| | BN | NbN | TiN | ThN | HfN | VN | ZrN | AlN |
| Nb—Cr—$SiO_2$ | 250 | ← | ← | ← | ← | ← | ← | ← |
| | 150 | 115 | 175 | 160 | 160 | 120 | 150 | 130 |
| | 315 | — | 370 | 365 | 375 | — | 310 | 290 |
| Ta—W—$SiO_2$ | 240 | ← | ← | ← | ← | ← | ← | ← |
| | 120 | 100 | 160 | 155 | 150 | 105 | 145 | 120 |
| | 270 | — | 375 | 360 | 360 | — | 350 | — |
| Nb—W—$SiO_2$ | 265 | ← | ← | ← | ← | ← | ← | ← |
| | 145 | 120 | 165 | 180 | 175 | 115 | 155 | 130 |
| | 300 | — | 350 | 395 | 380 | — | 300 | 290 |
| Ta—$Cr_2Ta$—$SiO_2$ | 260 | ← | ← | ← | ← | ← | ← | ← |
| | 150 | 115 | 180 | 180 | 175 | 105 | 145 | 125 |
| | 340 | — | 390 | 400< | 390 | — | 340 | 310 |
| W—La—$SiO_2$ | 220 | ← | ← | ← | ← | ← | ← | ← |
| | 130 | 105 | 145 | 150 | 140 | 100 | 140 | 105 |
| | 250 | — | 270 | 290 | 280 | — | 265 | — |

Combinations of a heater and a protective film exhibiting particularly excellent characteristics are as follows: Ta-$SiO_2$ and BN; Ta-$SiO_2$ and TiN; Ta-$SiO_2$ and ThN; Ta-$SiO_2$ and HfN; Ta-$SiO_2$ and ZrN; Mn-$SiO_2$ and BN; Mn-$SiO_2$ and TiN; Mn-$SiO_2$ and ThN; Mn-$SiO_2$ and HfN; Mn-$SiO_2$ and ZrN; Mn-$SiO_2$ and AlN; Mo-$SiO_2$ and BN; Mo-$SiO_2$ and TiN; Mo-$SiO_2$ and ThN; Mo-$SiO_2$ and HfN; Mo-$SiO_2$ and ZrN; Ti-$SiO_2$ and BN; Ti-$SiO_2$ and TiN; Ti-$SiO_2$ and HfN; Ti-$SiO_2$ and ZrN; Zr-$SiO_2$ and HfN; Zr-$SiO_2$ and ZrN; Hf-$SiO_2$ and BN; Hf-$SiO_2$ and ThN; Hf-$SiO_2$ and HfN; V-$SiO_2$ and TiN; V-$SiO_2$ and ThN; V-$SiO_2$ and HfN; V-$SiO_2$ and ZrN; Nb-$SiO_2$ and BN; Nb-$SiO_2$ and TiN; Nb-$SiO_2$ and ThN; Nb-$SiO_2$ and HfN; Nb-$SiO_2$ and ZrN; Cr-$SiO_2$ and TiN; Cr-$SiO_2$ and ThN; Cr-$SiO_2$ and HfN; W-$SiO_2$ and ThN; Ta-Mo-$SiO_2$ and BN; Ta-Mo-$SiO_2$ and TiN; Ta-Mo-$SiO_2$ and ThN; Ta-Mo-$SiO_2$ and HfN; Ta-Mo-$SiO_2$ and ZrN; Ta-Mo-$SiO_2$ and AlN; Nb-Mo-$SiO_2$ and BN; Nb-Mo-$SiO_2$ and TiN; Nb-Mo-$SiO_2$ and ThN; Nb-Mo-$SiO_2$ and HfN; Nb-Mo-$SiO_2$ and VN; Nb-Mo-$SiO_2$ and ZrN; Nb-Mo-$SiO_2$ and AlN; W-Mo-$SiO_2$ and BN; W-Mo-$SiO_2$ and TiN; W-Mo-$SiO_2$ and ThN; W-Mo-$SiO_2$ and HfN; W-Mo-$SiO_2$ and VN; W-Mo-$SiO_2$ and ZrN; W-Mo-$SiO_2$ and AlN; Ta-Cr-$SiO_2$ and BN; Ta-Cr-$SiO_2$ and TiN; Ta-Cr-$SiO_2$ and ThN; Ta-Cr-$SiO_2$ and HfN; Ta-Cr-$SiO_2$ and ZrN; Ta-Cr-$SiO_2$ and AlN; W-Cr-$SiO_2$ and BN; W-Cr-$SiO_2$ and TiN; W-Cr-$SiO_2$ and ThN; W-Cr-$SiO_2$ and HfN; W-Cr-$SiO_2$ and ZrN; Nb-Cr-$SiO_2$ and BN; Nb-Cr-$SiO_2$ and TiN; Nb-Cr-$SiO_2$ and ThN; Nb-Cr-$SiO_2$ and HfN; Nb-Cr-$SiO_2$ and ZrN; Ta-W-$SiO_2$ and TiN; Ta-W-$SiO_2$ and ThN; Ta-W-$SiO_2$ and HfN; Ta-W-$SiO_2$ and ZrN; Nb-W-$SiO_2$ and BN; Nb-W-$SiO_2$ and TiN; Nb-W-$SiO_2$ and ThN; Nb-W-$SiO_2$ and HfN; Nb-W-$SiO_2$ and ZrN; Ta-Cr-$_2$Ta-$SiO_2$ and BN; Ta-$Cr_2Ta$-$SiO_2$ and TiN; Ta-$Cr_2Ta$-$SiO_2$ and ThN; Ta-$Cr_2Ta$-$SiO_2$ and HfN; Ta-$Cr_2Ta$-$SiO_2$ and ZrN; Ta-$Cr_2Ta$-$SiO_2$ and AlN etc. Those combinations exhibited data of the running distance more than three times that of the conventional head 1*a*. It is further shown that other combinations in Table II also show the running distance more than twice that of the conventional head 1*a*.

In addition, the characteristics of a sample 3d having a thinner protective layer of nitride were examined. The sample 3d was similar to the sample 3b, except that the sample 3d had a BN protection layer of 3 $\mu$m in thickness. It was found that the sample 3d exhibited normalized input power of 160% in the stepped stress test and running distance of 230% in the running test, those characteristics being considerably superior to those of the conventional head. Also the necessary input power to the heater for printing was decreased by approximately 15%.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thermal head for a printer comprising:
   - a substrate;
   - a heater layer on said substrate, said heater layer comprising Mn-$SiO_2$;
   - lead wires connected to said heater layer for supplying electric power thereto; and
   - a single protective layer for protecting said heater layer and said lead wires, said protective layer comprising $Y_2O_3$.

2. A thermal head for a printer comprising:
   - a substrate;
   - a heater layer on said substrate, said heater layer comprising Mn-$SiO_2$;
   - lead wires connected to said heater layer for supplying electric power thereto; and
   - a single protective layer for protecting said heater layer and said lead wires, said protective layer comprising HfN.

* * * * *